Sept. 10, 1929.    J. M. DAPRON ET AL    1,727,397
VARIABLE SPEED BRAKE
Filed Jan. 7, 1928
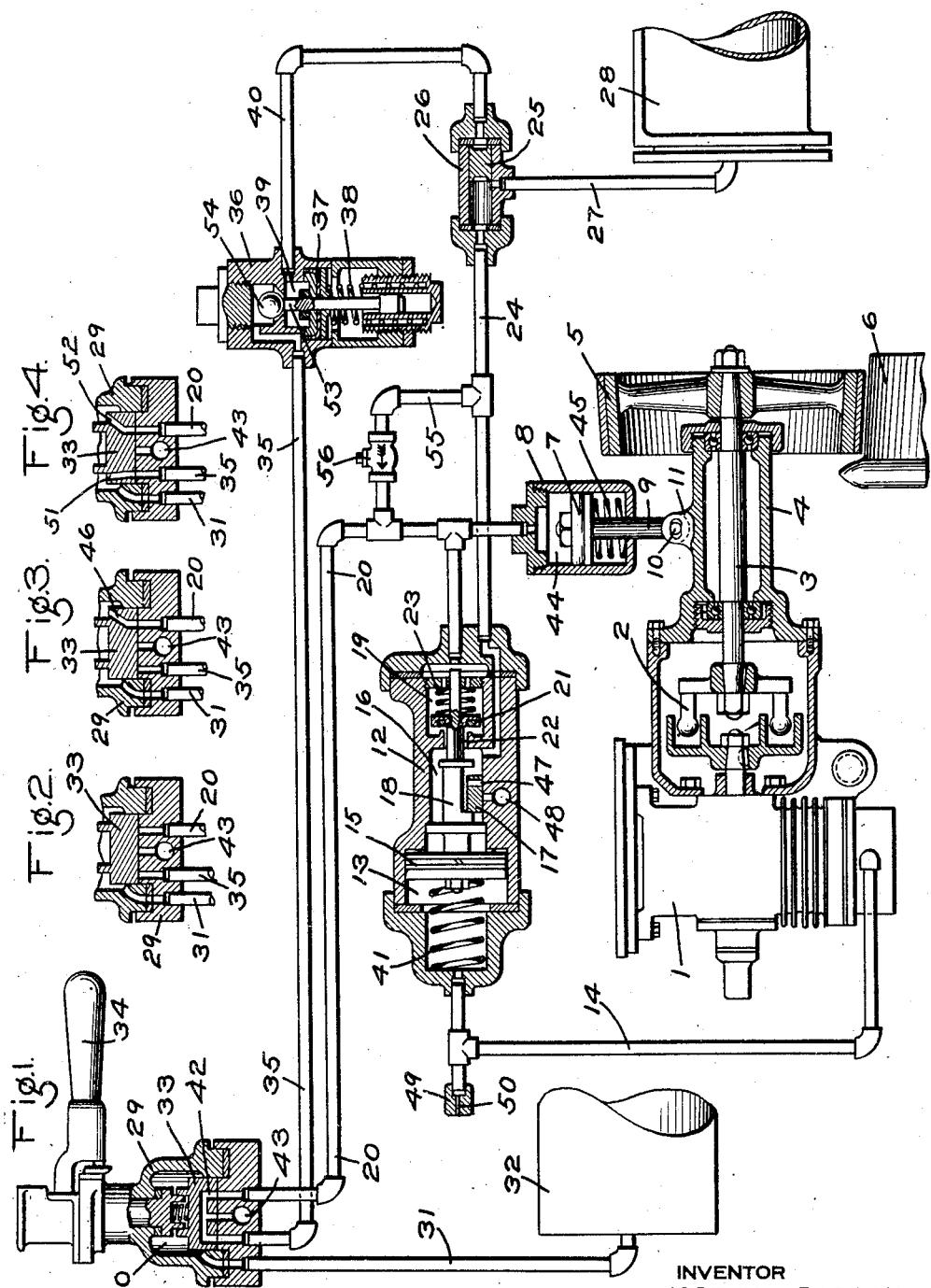
INVENTOR
JOSEPH M. DAPRON
AND
ELLERY R. FITCH
BY *Wm. M. Cady*
ATTORNEY Patented Sept. 10, 1929.

1,727,397

UNITED STATES PATENT OFFICE.

JOSEPH M. DAPRON, OF ST. LOUIS, MISSOURI, AND ELLERY R. FITCH, OF WESTWOOD, NEW JERSEY, ASSIGNORS TO THE WESTINGHOUSE AIR BRAKE COMPANY, OF WILMERDING, PENNSYLVANIA, A CORPORATION OF PENNSYLVANIA.

VARIABLE-SPEED BRAKE.

Application filed January 7, 1928. Serial No. 245,107.

This invention relates to fluid pressure brakes, and more particularly to a train speed controlled fluid pressure brake.

The principal object of our invention is to provide a train speed controlled fluid pressure brake, in which the brake cylinder pressure is regulated according to the pressure of fluid compressed by a compressor driven at a speed proportional to the speed of the vehicle.

Other objects and advantages will appear in the following more detailed description of the invention.

In the accompanying drawing; Fig. 1 is a sectional diagrammatic view of a vehicle speed controlled fluid pressure brake embodying our invention; Fig. 2 a sectional view of the brake valve device, showing the rotary valve in lap position; Fig. 3 a sectional view of the brake valve device, showing the rotary valve in service application position; and Fig. 4 a sectional view of the brake valve device, showing the rotary valve in emergency application position.

As shown in the drawing, the equipment may comprise a fluid compressor 1, having a flexible operating connection 2 to a driving shaft 3 having bearings in a movable casing 4. Secured to the outer end of the driving shaft 3 is a friction wheel 5 which is adapted to engage the tread surface of a vehicle wheel 6.

For shifting the wheel 5 into and out of engagement with the vehicle wheel 6, a piston 7, contained in cylinder 8, is connected by a stem 9 to the casing 4, through a pivot pin 10, which is carried by the end of the stem and which works in an elongated slot of a lug 11 carried by said casing.

A relay valve device is provided comprising a casing 12 having a piston chamber 13 connected to the fluid pressure discharge pipe 14 of the compressor 1 and containing a piston 15, a valve chamber 16 containing a slide valve 17 operable by a stem 18 secured to the piston 15, and a valve chamber 19, connected to a straight air brake pipe 20 and containing a poppet valve 21 having a stem 22 adapted to be operated by engagement with the stem 18, the valve 21 controlling communication from valve chamber 19 to valve chamber 16 and being urged to its seat by a spring 23.

The valve chamber 16 is connected to a pipe 24 which leads to one side of a double check valve 25 contained in a casing 26, and when the double check valve is in its right hand position, as shown in Fig. 1, communication is established from pipe 24 to a pipe 27, leading to the brake cylinder 28.

A brake valve device is provided comprising a casing 29 having a valve chamber 30 connected by pipe 31 to a main reservoir 32 or other source of fluid under pressure and containing a rotary valve 33 adapted to be operated by a handle 34. An emergency brake pipe 35 leads to the seat of the rotary valve 33 and is connected to a protection valve device comprising a casing 36 containing a piston 37 subject on one side to the pressure of a coil spring 38 and having chamber 39 at the opposite side connected to a pipe 40 which leads to one side of the double check valve 25, so that when the double check valve is moved to its left hand position, communication is established from pipe 40 to the brake cylinder pipe 27.

The piston 15 is subject to the pressure of a coil spring 41, so that said piston is constantly subject to pressure whether the compressor is running or not.

In operation, with the brake valve handle 34 in release position, as shown in Fig. 1, the straight air pipe 20 and the emergency brake pipe 35 are connected through a cavity 42 in the rotary valve 33 with an exhaust port 43 and pipe 20 being connected to piston chamber 44 of piston 7, said chamber is at atmospheric pressure, permitting the spring 45 to maintain said piston and the casing 4 in the position shown, in which the friction wheel 5 is not in engagement with the vehicle wheel 6 and consequently the compressor 1 is not operated to compress fluid into pipe 14.

If it is desired to effect a service application of the brakes, the brake valve handle is turned to service position, in which the rotary valve 33 assumes the position shown in Fig. 3. Fluid under pressure from the main reservoir 32 is then supplied from valve chamber 30, through a port 46 in the rotary valve to the straight air pipe 20 and thence flows to piston chamber 44, operating the piston 7, so that the friction wheel 5 is moved into engagement with the vehicle wheel 6.

The compressor 1 is then operated at a speed proportional to the speed of the vehicle, and fluid is compressed by the compressor into pipe 14 and piston chamber 13 of the relay valve device 12, the pressure of fluid compressed being proportional to the speed at which the compressor is running.

Fluid under pressure from the straight air pipe is also supplied to the valve chamber 19 of the relay valve device 12 and flows past the open valve 21 to valve chamber 16 and thence to pipe 24. The double check valve 25, if not in its right hand position, will be shifted to said position by the pressure of fluid in pipe 24, so that communication from pipe 24 to pipe 27 is established, permitting the flow of fluid to the brake cylinder 28 to apply the brakes.

When the pressure of fluid acting on piston 15 in valve chamber 16 and in the brake cylinder has been increased to a degree slightly exceeding the pressure of fluid supplied by the compressor 1 to piston chamber 13 plus the pressure of spring 41, the piston 15 will be shifted toward the left, until the valve 21 is brought to its seat, but not sufficiently to cause the slide valve 17 to move to the position in which port 47 is connected to exhaust port 48. Further flow of fluid under pressure to the brake cylinder is thus cut off and the pressure of fluid supplied to the brake cylinder corresponds with the pressure of fluid supplied to the piston chamber 13 and is therefore in proportion to the speed of the train.

As the speed of the vehicle reduces, the speed of the compressor and consequently the pressure of fluid compressed reduces and as the pressure in piston chamber 13 reduces, the higher pressure in valve chamber 16 causes the piston 15 to be shifted farther toward the left until the port 47 registers with the exhaust port 48. Fluid under pressure is then vented from valve chamber 16 and the brake cylinder, the port 47 being in registry with the exhaust port 48 to such a degree that the rate of reduction in brake cylinder pressure substantially corresponds with the rate of reduction in pressure in the piston chamber 13 and therefore with the rate at which the speed of the vehicle is reduced.

A choke plug 49 having a restricted atmospheric port 50 is connected to pipe 14, so as to permit flow of fluid under pressure from pipe 14 at a rate dependent upon the flow area of the port 50 and the pressure of fluid compressed in the pipe 14 by operation of the compressor.

The flow area of the port 50 may be such as to provide any desired relation between the speed of the vehicle and the pressure of fluid in the pipe 14 and the piston chamber 13, as for example, to provide a braking force which will effect a retardation of the vehicle at a maximum rate short of a rate of retardation which would cause wheel sliding by exceeding the braking force which would overcome the frictional resistance between the vehicle wheels and the rail under average rail conditions.

In case of possible failure of the speed controlled brake, the brakes may still be applied by moving the brake valve handle 34 to emergency application position, in which the rotary valve 33 assumes the position shown in Fig. 4. In this position, a port 51 connects with the emergency pipe 35, so that fluid under pressure is supplied through said pipe to the protection valve device 36. When there is no pressure in the pipe 35, the piston 37 is maintained in its upper position by spring 38 and stem 53 associated with the piston then operates to hold the ball check valve 54 off its seat. Fluid under pressure from pipe 35 can flow past the ball check valve 54 to chamber 39 and thence through pipe 40 to the double check valve 25, which is thereby shifted to the left, so that communication is established from pipe 40 to pipe 27, thus permitting the flow of fluid under pressure to the brake cylinder 28, so as to effect an application of the brakes. When the brake cylinder pressure and the pressure in chamber 39 has been increased to a predetermined degree as determined by the spring 38, the piston 37 will be shifted so as to permit the ball check valve 54 to seat and prevent the further flow of fluid under pressure to the brake cylinder.

The brakes may be released either after a service or an emergency application of the brakes by moving the brake valve handle to release position, in which position, the pipes 20 and 35 are connected through cavity 42 in the rotary valve 33 with exhaust port 43.

Fluid is then vented from the piston chamber 44, causing the spring 45 to shift the piston 7, so that the friction wheel 5 is moved out of engagement with the vehicle wheel 6.

The compressor 1 then ceases operation and the pressure of fluid in piston chamber 13 is rapidly reduced to atmospheric pressure. The brake cylinder pressure acting in valve chamber 16 then shifts the piston 15, so that port 47 registers with exhaust passage 48 and fluid under pressure is vented from the brake cylinder 28.

After the brake cylinder pressure has been reduced sufficiently, the spring 41 will move the piston 15 and slide valve 17 toward the right, so as to cut off communication between port 47 and exhaust passage 48. The exhaust of fluid remaining in the brake cylinder is provided for by employing a by-pass pipe 55 containing a non-return check valve 56, through which fluid can flow from the brake cylinder through pipe 24, directly to the straight air pipe 20.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. In a fluid pressure brake, the combination with a brake cylinder, of a fluid compressor driven at a speed proportional to the speed of the vehicle, a pipe to which fluid compressed by the compressor is supplied, and a valve device operated according to the pressure of fluid in said pipe for regulating the pressure of fluid supplied to the brake cylinder, said pipe having a restricted vent port opening to the atmosphere.

2. In a fluid pressure brake, the combination with a brake cylinder, of a fluid compressor driven at a speed proportional to the speed of the vehicle, a pipe to which fluid compressed by the compressor is supplied, a valve device subject to the opposing pressures of said pipe and the brake cylinder for controlling the supply of fluid to the brake cylinder, and a spring acting on said valve device to also oppose the brake cylinder pressure thereon.

3. In a fluid pressure brake, the combination with a brake cylinder, of a fluid compressor having a discharge pipe, means for driving said compressor at a speed proportional to the speed of the vehicle, and a valve device subject to the opposing pressures of the brake cylinder and a chamber connected to said discharge pipe for controlling the supply of fluid under pressure to the brake cylinder, said chamber communicating with a constantly open atmospheric vent port.

4. In a fluid pressure brake, the combination with a brake cylinder, of a fluid compressor having a discharge pipe, means for driving said compressor at a speed proportional to the speed of the vehicle, and a valve device subject to the opposing pressures of the brake cylinder and a chamber connected to said discharge pipe for controlling the supply of fluid under pressure to the brake cylinder, and a spring opposing brake cylinder pressure on said valve device, said chamber being open to the atmosphere through a restricted port.

In testimony whereof we have hereunto set our hands. Signed by JOSEPH M. DAPRON on the 16th day of December, 1927; and by ELLERY R. FITCH on the 29th day of December, 1927.

JOSEPH M. DAPRON.
ELLERY R. FITCH.